(12) United States Patent
Stevens

(10) Patent No.: US 7,726,242 B2
(45) Date of Patent: Jun. 1, 2010

(54) INITIATOR ASSEMBLY

(75) Inventor: Bruce A. Stevens, Oakland, MI (US)

(73) Assignee: TK Holdings, Inc., Armada, MI (US)

( * ) Notice: Subject to any disclaimer, the term of this patent is extended or adjusted under 35 U.S.C. 154(b) by 0 days.

(21) Appl. No.: 11/708,910

(22) Filed: Feb. 20, 2007

(65) Prior Publication Data

US 2007/0193465 A1 Aug. 23, 2007

Related U.S. Application Data

(60) Provisional application No. 60/774,576, filed on Feb. 17, 2006.

(51) Int. Cl.
*F42B 3/10* (2006.01)
(52) U.S. Cl. ............... 102/202.12; 102/202.5; 102/202.9; 102/202.14
(58) Field of Classification Search ......... 102/530–531, 102/202.5, 202.9, 202.12, 202.14; 280/728.1, 280/730.1–730.2, 733, 741
See application file for complete search history.

(56) References Cited

U.S. PATENT DOCUMENTS

| | | | | |
|---|---|---|---|---|
| 5,648,634 A * | 7/1997 | Avory et al. | ......... | 102/202.1 |
| 6,009,809 A * | 1/2000 | Whang | ......... | 102/202.7 |
| 6,168,202 B1 * | 1/2001 | Stevens | ......... | 280/737 |
| 6,419,177 B2 * | 7/2002 | Stevens | ......... | 242/374 |
| 6,460,794 B1 * | 10/2002 | Stevens | ......... | 242/374 |
| 6,505,790 B2 * | 1/2003 | Stevens | ......... | 242/374 |
| 6,520,443 B2 * | 2/2003 | Stevens | ......... | 242/374 |
| 6,789,485 B2 * | 9/2004 | Moquin et al. | ......... | 102/530 |
| 7,097,203 B2 * | 8/2006 | Burns et al. | ......... | 280/741 |
| 7,192,055 B2 * | 3/2007 | Stevens et al. | ......... | 280/741 |
| 7,243,946 B2 * | 7/2007 | Stevens et al. | ......... | 280/741 |
| 7,370,885 B2 * | 5/2008 | Stevens | ......... | 280/741 |
| 2002/0079680 A1 * | 6/2002 | Moquin et al. | ......... | 280/736 |
| 2005/0017496 A1 * | 1/2005 | Stevens et al. | ......... | 280/806 |
| 2005/0156075 A1 * | 7/2005 | Stevens et al. | ......... | 242/382 |
| 2005/0189740 A1 * | 9/2005 | Stevens | ......... | 280/728.2 |
| 2005/0189747 A1 * | 9/2005 | Khandhadia et al. | ..... | 280/730.2 |
| 2005/0200103 A1 * | 9/2005 | Burns et al. | ......... | 280/730.2 |
| 2005/0235863 A1 * | 10/2005 | Stevens | ......... | 102/531 |
| 2006/0022443 A1 * | 2/2006 | Stevens et al. | ......... | 280/736 |
| 2006/0033317 A1 * | 2/2006 | Stevens | ......... | 280/741 |
| 2006/0097506 A1 * | 5/2006 | Stevens | ......... | 280/806 |
| 2006/0131866 A1 * | 6/2006 | Stevens et al. | ......... | 280/806 |
| 2006/0163864 A1 * | 7/2006 | Dunham et al. | ......... | 280/806 |
| 2006/0219340 A1 * | 10/2006 | Dunham et al. | ......... | 149/19.7 |
| 2007/0085318 A1 * | 4/2007 | Stevens | ......... | 280/806 |
| 2007/0096451 A1 * | 5/2007 | Stevens | ......... | 280/806 |
| 2007/0145732 A1 * | 6/2007 | Stevens | ......... | 280/806 |
| 2007/0193465 A1 * | 8/2007 | Stevens | ......... | 102/202.1 |
| 2007/0228013 A1 * | 10/2007 | Stevens et al. | ......... | 218/1 |

* cited by examiner

*Primary Examiner*—Michael Carone
*Assistant Examiner*—Michael D David
(74) *Attorney, Agent, or Firm*—L.C. Begin & Associates, PLLC

(57) ABSTRACT

A bore seal includes a polymeric interface portion adapted for coupling so an initiator activation signal transmission medium, and an initiator-receiving portion adapted for receiving an initiator therein. The bore seal generally houses a pyrotechnic initiator or igniter therein, for incorporation into a gas generating system or other system having a pyrotechnically actuatable element.

8 Claims, 6 Drawing Sheets

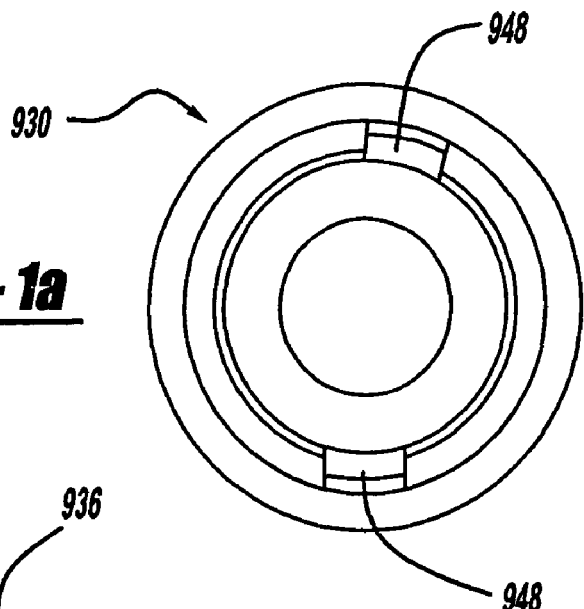
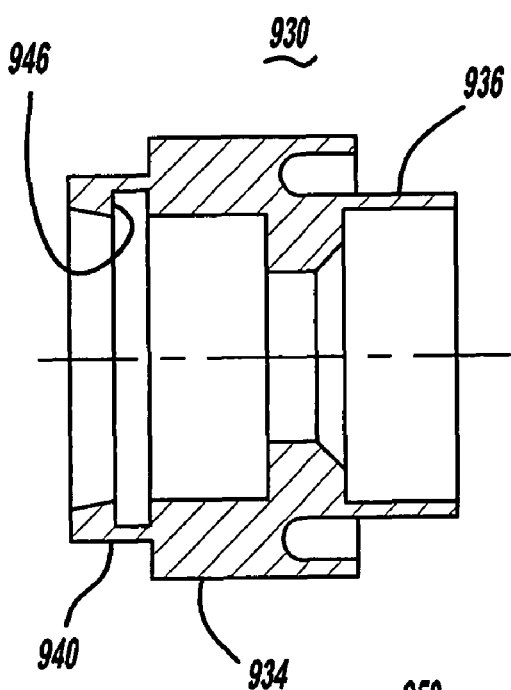
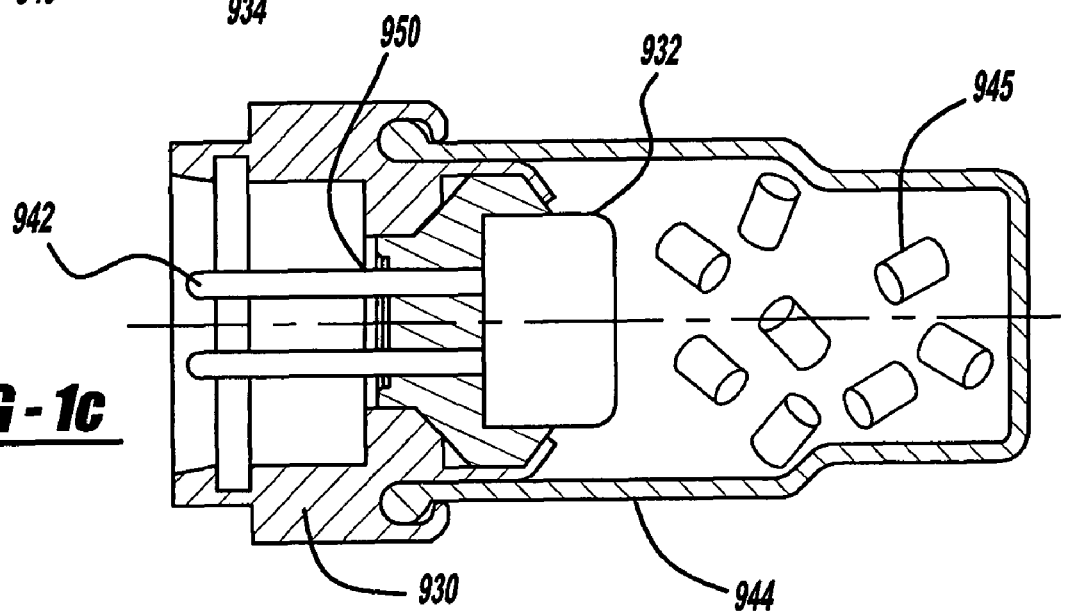
FIG - 1a
FIG - 1b
FIG - 1c

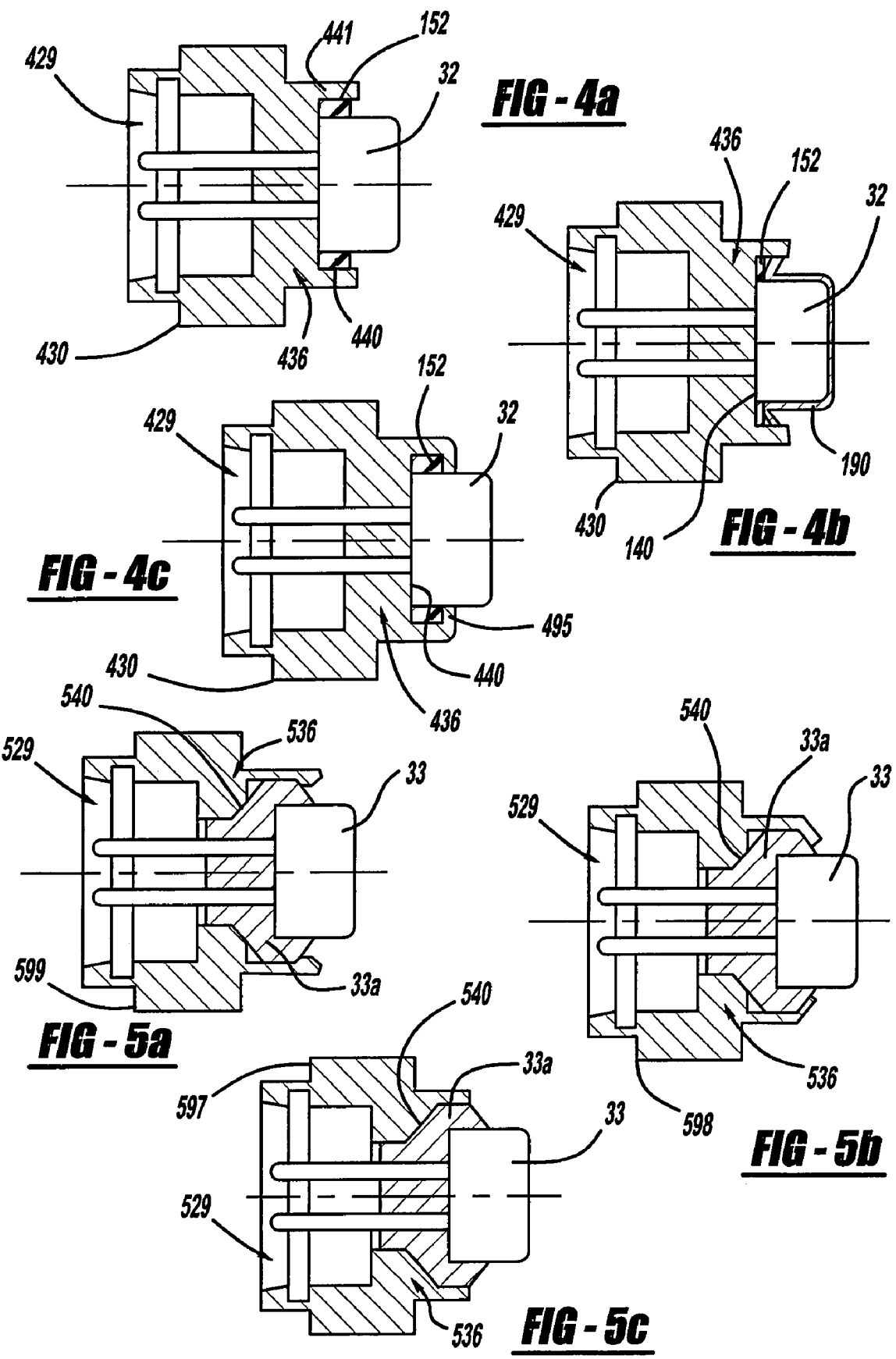

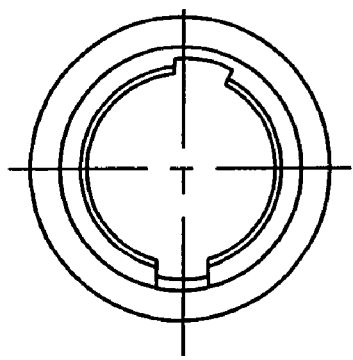
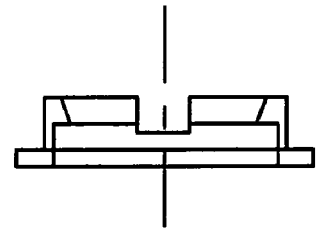
FIG - 7a
FIG - 7b
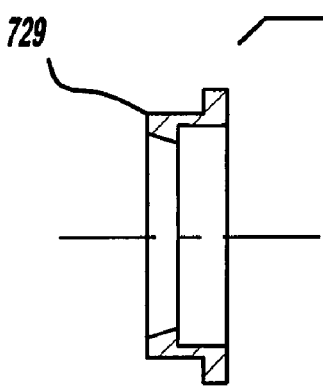
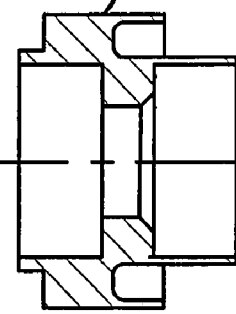
FIG - 7c
FIG - 7d
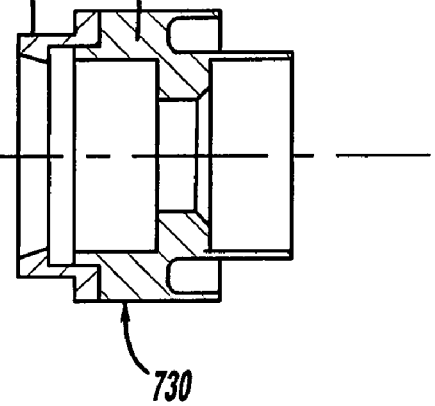
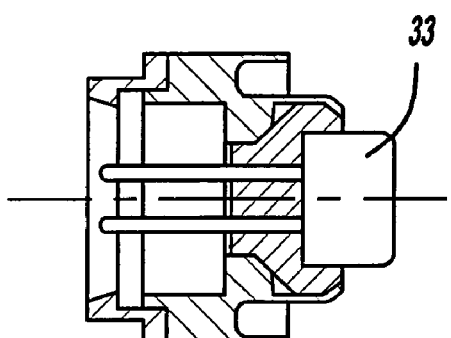
FIG - 7e
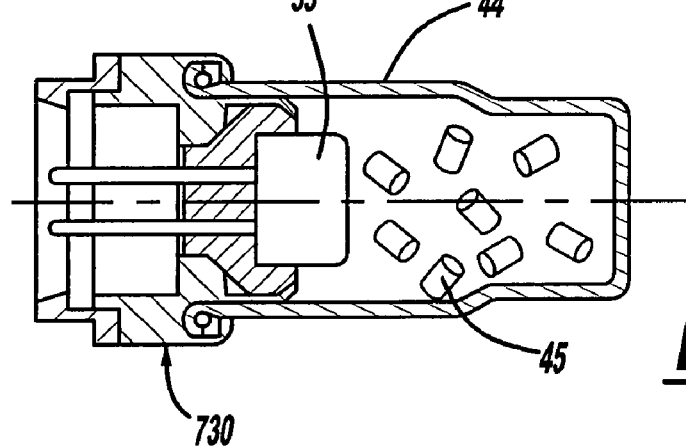
FIG - 7f

INITIATOR ASSEMBLY

CROSS-REFERENCE TO RELATED APPLICATIONS

This application claims the benefit of U.S. Provisional Application Ser. No. 60/774,576 filed on Feb. 17, 2006.

BACKGROUND OF THE INVENTION

The present invention relates generally to gas generating systems and, more particularly, to gas generators used in vehicle occupant protection systems and related components, such as seatbelt pretensioners.

Gas generators used in seatbelt pretensioners are known as micro gas generators (MGG's) due to the relatively small size of the gas generator. Exemplary pretensioners using such micro gas generators include those described in U.S. Pat. Nos. 6,460,794, 6,505,790, 6,520,443, and 6,419,177, incorporated herein by reference. Micro gas generators generally include a bore seal for receiving and securing an initiator therein, an initiator including an initiator charge, and a gas generant composition which ignites and burns in response to activation of the initiator to produce gases for actuating the seatbelt pretensioner.

A portion of the bore seal is configured to mate with a mating connector element formed on a portion of a vehicle to which the initiator assembly is attached. Typically, the bore seal is formed from a metal, such as steel or aluminum. Mating features (such as slots and undercuts) and other desired features are machined into appropriate surfaces of the metal bore seal. However, machining these features into the bore seal is relatively expensive. Some existing micro gas generator designs incorporate an initiator assembly in which the initiator is molded into a bore seal formed from a plastic material to include the desired mating features. However, limitations on molding process temperatures and pressures imposed by the structure of the initiator tend to limit the range of plastics suitable for insert molding. This results in a bore seal having insufficient strength for micro gas generator operation.

SUMMARY OF THE INVENTION

In accordance with the present invention, a bore seal is provided which includes a polymeric interface portion adapted for coupling to an initiator activation signal transmission medium, and an initiator-receiving portion adapted for receiving an initiator therein. The bore seal generally houses a pyrotechnic initiator or igniter therein, for incorporation into a gas generating system or other system having a pyrotechnically actuatable element.

BRIEF DESCRIPTION OF THE DRAWINGS

FIGS. 1a-1c are cross-sectional side views showing one embodiment of a conventional bore seal and a micro gas generator incorporating the bore seal;

FIGS. 2a-2c, 3a-3c, and 7a-7f are cross-sectional side views showing various embodiments of a bore seal in accordance with the present invention incorporated into micro gas generators;

FIGS. 4a-4c, 5a-5c, and 6a-6b are cross-sectional side views showing various additional embodiments of a bore seal in accordance with the present invention;

DETAILED DESCRIPTION

Figure 2A:
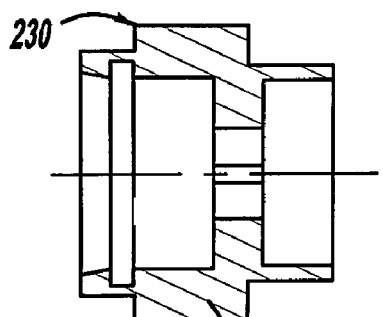

FIGS. 1a-1c show one embodiment of a conventional bore seal 930 as adapted for incorporation into a micro gas generator. Referring to FIGS. 1a-1c, an initiator or initiator assembly 932 is secured within a bore seal 930 for mounting within an associated element of a vehicle occupant protection system, for example. In the embodiment shown in FIGS. 1a-1c, bore seal 930 includes a body 934 and an annular wall 936 extending in a first direction from body 934 to define a cylindrical cavity for receiving an initiator or initiator assembly 932 therein. Another annular wall 940 extends from body 934 in a second direction, opposite the first direction, to define another cylindrical cavity adapted for housing the initiator electrodes 942. A rear portion of bore seal 930 is configured to provide an interface mateable with a complementary connector of a wiring harness or other suitable initiator activation signal transmission medium. FIG. 1c shows the bore seal 930 of FIGS. 1a and 1b incorporated into a micro-gas generator (MGG) assembly. A casing 944 for containing a gas generant composition 945 therein is secured to bore seal 930 using adhesive application, ultrasonic welding, or other suitable methods. Bore seal 930 is typically formed from a metal or metal alloy using a suitable manufacturing process, such as die casting or machining.

FIGS. 1a-1c also show features typically included in the mating portion of a conventional bore seal. As seen in FIGS. 1a and 1b, the bore seal incorporates a connector interface including an undercut 946 provided for connector and shorting clip retention, and a pair of radial slots 948 adapted to accommodate bumps formed on the shorting clip (not shown), to provide orientation for the clips and to prevent rotation of the clips. Bore seal 930 has one or more axially extending holes 950 through which initiator electrodes 942 extend. Other features may also be included in the bore seal depending upon a particular application.

In conventional all-metal bore seals, the above-mentioned features are typically machined, a relatively expensive process. In the present invention, the connector mating features and other desired features normally machined into metal surfaces of the bore seal are instead molded into the bore seal, either as part of a completely molded bore seal formed from a relatively high-strength plastic material separate from the initiator, or as a polymeric bore seal element affixed to an associated metal bore seal element to form a bore seal including a polymeric interface portion adapted for coupling to the initiator activation signal transmission medium, and an initiator-receiving portion adapted for receiving the initiator therein. In general, the bore seal also incorporates features which enable mounting and sealing of the bore seal within a device, such as a seat belt pretensioner, which utilizes an initiator.

Figure 2B:
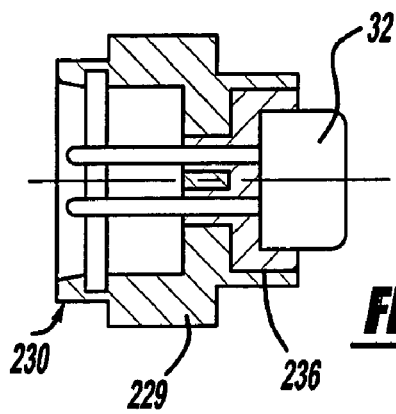
Figure 2C:
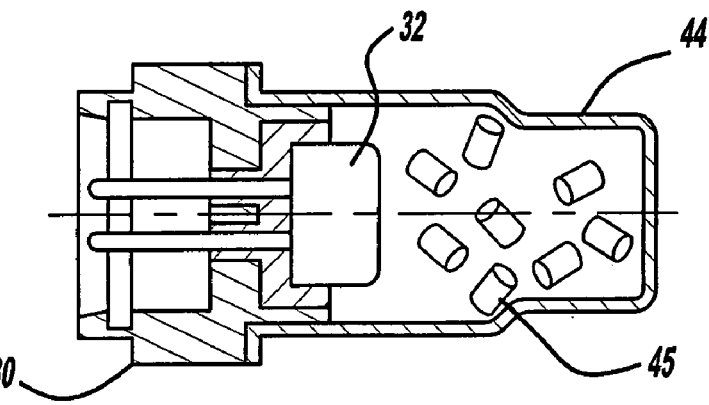

FIGS. 2a-2c show a particular embodiment of a bore seal 230 in accordance with the present invention. In all of the embodiments described herein, polymer and/or metal portions of the bore seal may be joined together using suitable methods. Non-exclusive examples of such methods include ultrasonic welding, interference fits, snap fits, adhesive application, and heat crimping. An initiator assembly is affixed to the bore seal for use in a gas generating system or other suitable application. In the embodiment shown in FIGS. 2a-2c, an interface portion 229 of bore seal 230 is formed from a relatively high-strength polymer material, for example Polybutylene Terephthalate (PBT) or polycarbonate. An initiator 32 is then molded separately into initiator-receiving portion 236 of the bore seal. If required, initiator-receiving portion 236 may be formed from a polymer material (for example, a nylon) different from that of interface portion 230, to accommodate processing requirements relating to the initiator or the interface portion. A casing 44 for containing gas generant material 45 therein is then attached to a shoulder or other suitable feature formed on bore seal 230, as shown in FIG. 2c. All initiator assemblies referred to herein may be formed as known in the art. One exemplary initiator assembly construction is described in U.S. Pat. No. 6,009,809, herein incorporated by reference.

Figure 3A:
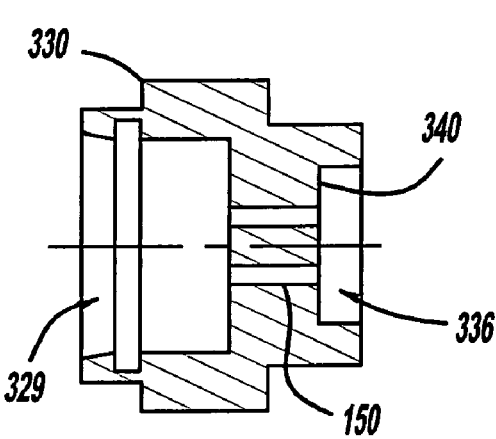
Figure 3B:
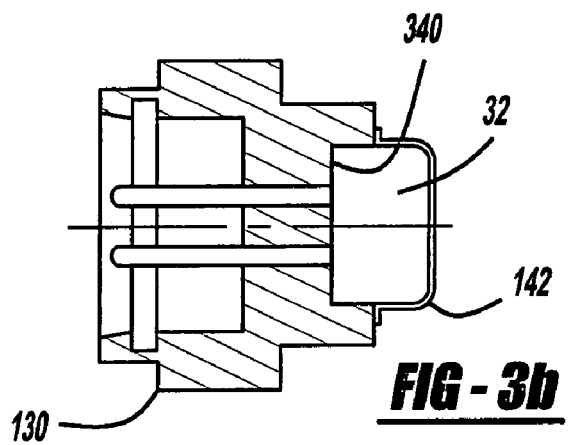
Figure 3C:
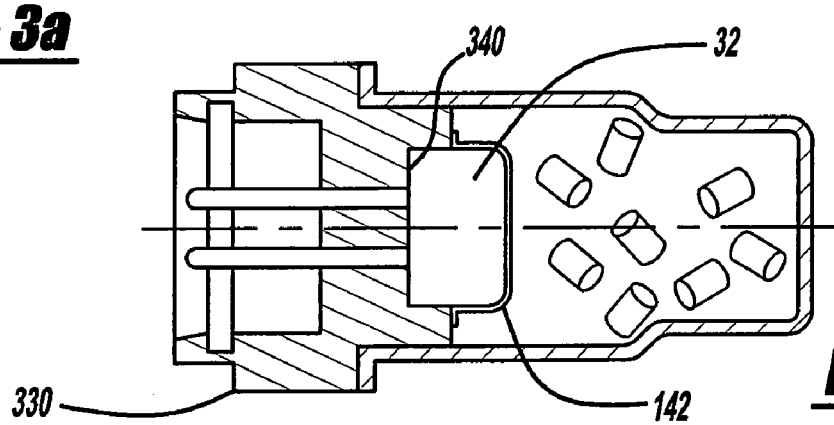

FIGS. 3a-3c and 4a-4c show other embodiments of a bore seal in accordance with the present invention. In FIGS. 3a-3c and 4a-4c, the interface portions 329, 429 and the initiator-receiving portions 336, 436 of bore seals 330 and 430, respectively, are incorporated unitarily into a piece of polymer material. Referring to FIG. 3a, bore seal 330 as molded includes a cavity 340 formed in the initiator receiving portion and adapted for receiving an initiator assembly 32 therein. The initiator assembly is then secured within cavity 340 using any suitable method. For example, in FIG. 3b an insulator cup 142 is positioned over the initiator assembly and attached to bore seal 330. Cup 142 may be used thusly to secure the initiator within cavity 340. Cup 142 may be secured to the bore seal using any of a variety of methods, including adhesive attachment, heat-staking, or heat-crimping, for example. FIG. 3c shows the bore seal of FIGS. 3a and 3b incorporated into a micro gas generator.

In FIG. 4a, an insulating material 152 is positioned between initiator assembly 32 and an annular wall 441 or similar structure formed in the initiator-receiving portion 436 of bore seal 430, thereby creating an interference fit for retaining initiator assembly 32 within a cavity 440. In a particular embodiment, insulator 152 is melt-pressed between initiator assembly 32 and a wall 441 or other portion of bore seal 430 to form a bond therebetween. In FIG. 4b, a retaining member 190 formed from a metal, polymer, or other suitable material engages both a portion of the initiator assembly and walls formed in cavity 440, to retain initiator assembly 32 within cavity 140. In FIG. 4c, initiator assembly 32 is secured in cavity 440 by portions 195 of bore seal 430 which are heat-crimped over portions of initiator 32, over portions of an insulator cup (not shown), or over portions of another feature formed on or attached to the initiator.

FIGS. 5a-5c show additional embodiments of a bore seal in accordance with the present invention. In FIGS. 5a-5c, a cavity 540 is formed in an initiator-receiving portion 536 of bore seal 599 to accommodate an initiator assembly 33 therein. In the embodiment shown in FIGS. 5a-5c, initiator assembly 33 has an integral insulating housing 33a already molded or otherwise formed thereon. Initiator assembly 33 may be secured within cavity 540 using one or more of the methods described herein. In the embodiment shown in FIG. 5a, initiator assembly 33 is secured within cavity 540 of bore seal 599 using a snap-fit. In the embodiment shown in FIG. 5b, initiator assembly 33 is secured within cavity 540 of bore seal 598 by crimping a portion of the bore seal over initiator assembly 33. In the embodiment shown in FIG. 5c, initiator assembly 33 is secured within cavity 540 of bore seal 597 using adhesive application to bond housing 33a to bore seal 530, snap-fitting, or other methods. Other securement methods are also contemplated.

Figure 6A:
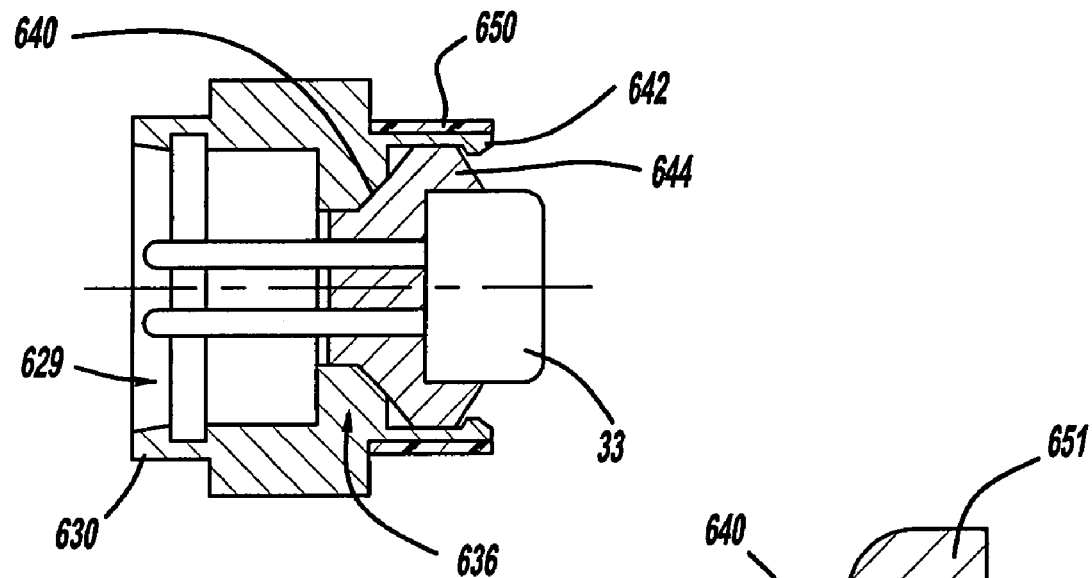
Figure 6B:
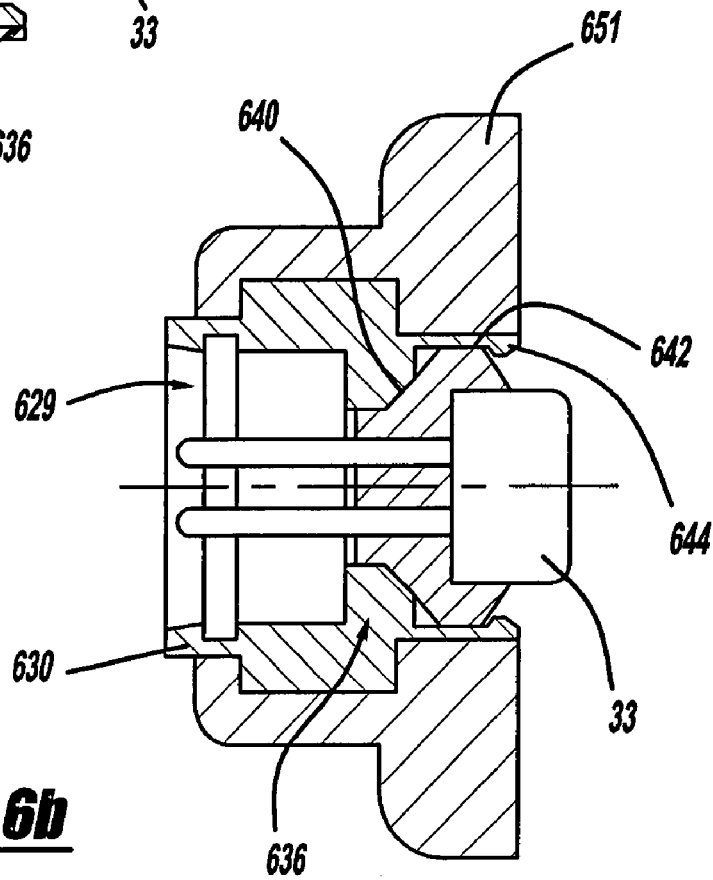

In FIGS. 6a and 6b, a cavity 640 is formed in the initiator receiving portion 636 of bore seal 630. One or more snap-fit features (in FIGS. 6a and 6b, shown as resiliently deflectable peripheral tabs or wall portions 642 extending from bore seal 630 adjacent cavity 640) are provided for engaging the initiator assembly in a snap-fit to secure the initiator assembly within the initiator receiving portion. Wall portions 642 may include one or more retention features 644 formed thereaolong. An initiator or initiator assembly 33 is inserted axially into cavity 640, causing resilient tabs 642 to deflect radially outward. Tabs 642 snap back to undeflected or substantially undeflected states when initiator assembly 33 has been fully inserted into cavity 640. In particular embodiments, a reinforcing member in the form of a sleeve (of which various embodiments 650, 651 are shown in FIGS. 6a and 6b, respectively) is applied to the exterior of the support tabs 642 after positioning of the initiator within cavity 640, thereby substantially preventing deflection of the tabs after insertion of the initiator into the cavity. This retains the initiator within the bore seal.

FIGS. 7a-7f show yet another embodiment of a bore seal in accordance with the present invention. In the embodiment shown in FIG. 7, the initiator-receiving portion 736 of a bore seal 730 is formed from a metal or metal alloy, while the interface portion 729 of the bore seal incorporating the connector mating features is formed from a high-strength polymer material. Polymer portion 729 may be molded as a separate part and attached to metal portion 736 using one of the methods previously discussed, or other methods. Alternatively, polymer portion 729 may be molded directly onto metal portion 736. In the embodiment shown in FIG. 7e, a portion of the initiator receiving portion 736 is crimped over a portion of the initiator assembly to secure the initiator assembly within the initiator receiving portion. FIG. 7f shows a casing 44 secured to bore seal 730 of FIG. 7e. Casing 44 encloses a gas generant material 45 positioned in fluid communication with initiator 33. In embodiments where the initiator receiving portion is formed from a metallic material, an insulating member (not shown) may be is positioned between each initiator electrode and the initiator receiving portion to insulate the electrode from the initiator receiving portion.

Figure 8:
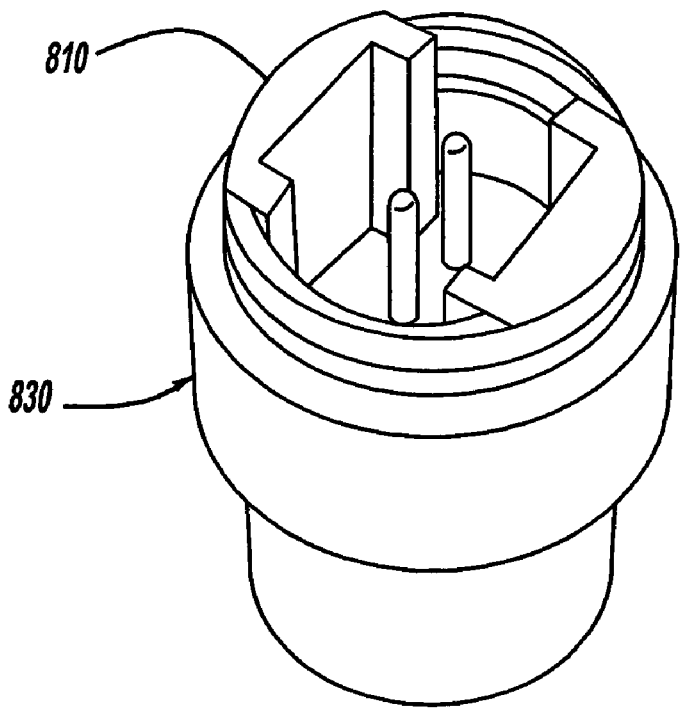
FIG. 8 is an end perspective view of yet another embodiment of a bore seal in accordance with the present invention.

FIG. 8 shows yet another embodiment 530 of a bore seal in accordance with the present invention. In FIG. 8, a grounding clip 510 is insert-molded into the polymeric portion of the bore seal, thereby eliminating the step of separately installing the ground clip in the bore seal.

By separately molding the bore seal (or the portion of the bore seal that includes the connector mating features), the connector portion of the bore seal including slots, undercuts, and other features can be readily incorporated into the bore seal at a comparatively low cost. In addition, the range of materials usable for forming the connector features is greatly expanded, enabling the connector features to be molded using a relatively high-strength polymer material processed at relatively high molding temperatures and pressures and enabling other desirable aspects (for example, low moisture permeability) of various materials to be utilized. This reduces the manufacturing cost of the bore seal and increases the number of design options available with respect to the bore seal.

Figure 9:
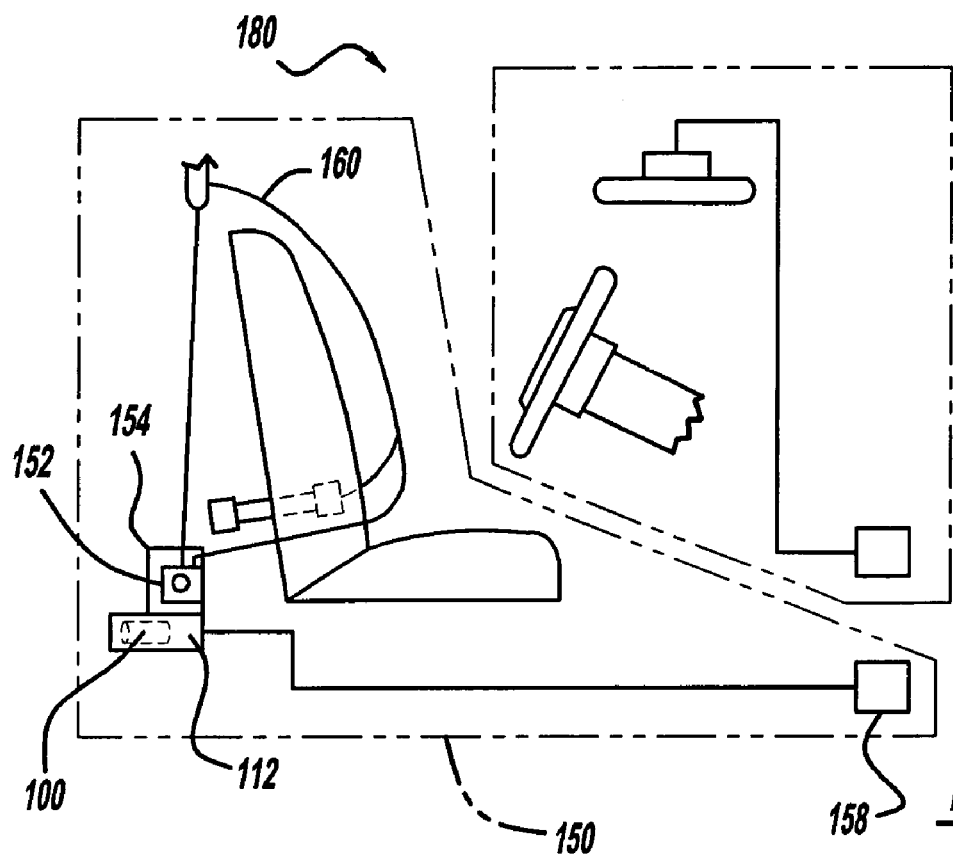
FIG. 9 is a schematic representation of an exemplary vehicle occupant protection system incorporating a micro gas generator utilizing a bore seal in accordance with the present invention.

Referring to FIG. 9, in a particular application, a micro gas generator 100 incorporating a bore seal as described herein is incorporated into a safety belt pretensioner 112 employed in a safety belt assembly 150 used in a vehicle occupant protection system 180. Safety belt assembly 150 includes a safety belt housing 152 and a safety belt 160 extending from housing 152. A safety belt retractor mechanism 154 (for example, a spring-loaded mechanism) may be coupled to an end portion of the belt. Safety belt pretensioner 112 may be coupled to belt retractor mechanism 154 to actuate the retractor mechanism in the event of a collision. Gas generator 100 is adapted to actuate seat belt retractor mechanism 154 to pretension safety belt 160. Typical seat belt retractor mechanisms which may be used in conjunction with safety belt 160 are described in U.S. Pat. Nos. 5,743,480, 5,553,803, 5,667,161, 5,451,008, 4,558,832 and 4,597,546, incorporated herein by reference. Safety belt assembly 150 may be in operative communication with (or may include) a crash event sensor 158 (for example, an inertia sensor or an accelerometer) that is in operative communication with a crash sensor algorithm (not shown) which signals actuation of belt pretensioner 112 via, for example, activation of an initiator (not shown in FIG. 9) in micro gas generator 100. U.S. Pat. Nos. 6,505,790 and 6,419,177 provide illustrative examples of pretensioners actuated in such a manner. Unless otherwise noted, elements of the pretensioner may be fabricated using methods known in the art. In addition, a gas generator incorporating a bore seal as described herein may be incorporated into any of a wide variety of alternative pretensioner designs.

It will be understood that the foregoing descriptions of embodiments of the present invention are for illustrative purposes only. As such, the various structural and operational features herein disclosed are susceptible to a number of modifications commensurate with the abilities of one of ordinary skill in the art, none of which departs from the scope of the present invention as defined in the appended claims.

What is claimed is:

1. A bore seal assembly comprising:
   a bore seal including an initiator-receiving portion adapted for receiving an initiator assembly therein and a polymeric interface portion adapted for coupling to an initiator activation signal transmission medium;
   an initiator assembly received in the initiator receiving portion, and;
   a retaining member separate from the bore seal and from the initiator assembly, the retaining member including at least a portion thereof inserted between the bore seal and the initiator assembly and providing an interference fit between the retaining member and the bore seal and between the retaining member and the initiator assembly, to secure the initiator assembly within the initiator receiving portion.

2. The bore seal assembly of claim 1 further comprising a grounding member molded into the interface portion.

3. The bore seal assembly of claim 1 wherein the retaining member comprises an insulating cup positioned over the initiator assembly.

4. The bore seal assembly of claim 1 wherein the retaining member comprises an insulating material.

5. A gas generating system including a bore seal assembly in accordance with claim 1.

6. A vehicle occupant protection system including a bore seal assembly in accordance with claim 1.

7. A bore seal assembly comprising:
   an initiator-receiving portion adapted for receiving an initiator therein;
   a polymeric interface portion adapted for coupling to an initiator activation signal transmission medium; and
   at least one resilient portion adapted to resiliently deflect responsive to movement of an initiator in a direction into the initiator-receiving portion, to admit the initiator into the initiator-receiving portion, the at least one resilient portion also being adapted to return to a substantially undeflected position after the initiator is received in the initiator-receiving portion; and a reinforcing member supporting the at least one resilient portion after the initiator assembly is received in the initiator receiving portion, to substantially prevent deflection of the at least one resilient portion after the initiator assembly is received in the initiator receiving portion.

8. The bore seal assembly of claim 7 wherein the at least one resilient portion is adapted to resiliently deflect responsive to movement of an initiator in a direction out of the initiator-receiving portion, to permit the initiator to exit the initiator-receiving portion, and wherein the bore seal assembly further comprises a reinforcing member for supporting the at least one resilient portion to prevent deflection of the at least one resilient portion sufficient to permit an initiator to exit the initiator-receiving portion.

* * * * *

UNITED STATES PATENT AND TRADEMARK OFFICE
CERTIFICATE OF CORRECTION

PATENT NO. : 7,726,242 B2  Page 1 of 1
APPLICATION NO. : 11/708910
DATED : June 1, 2010
INVENTOR(S) : Stevens It is certified that error appears in the above-identified patent and that said Letters Patent is hereby corrected as shown below:

Title page, item [57]
In the Abstract Line 2; delete "so" and insert --to--

Signed and Sealed this

Sixteenth Day of November, 2010

David J. Kappos
*Director of the United States Patent and Trademark Office*